July 4, 1967
G. F. ASBURY ETAL
3,329,894
VISUAL AUTO CORRELATION METHOD TO DISTINGUISH
WANTED SIGNAL FROM NOISE
Filed Aug. 17, 1951
3 Sheets-Sheet 3
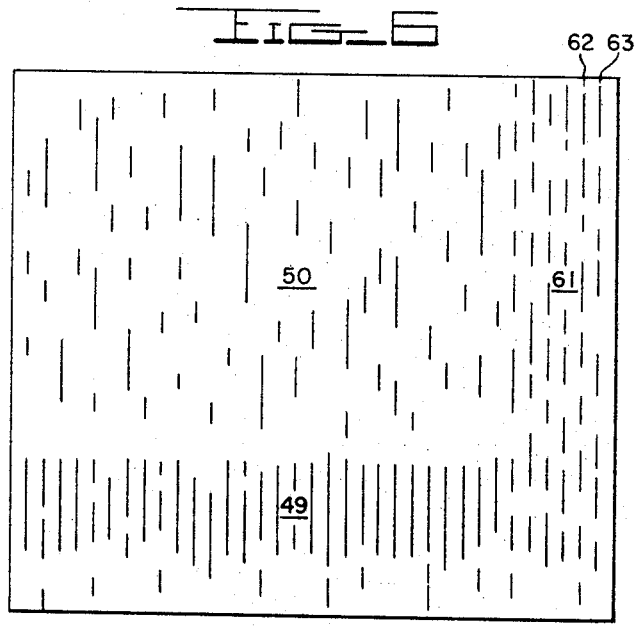
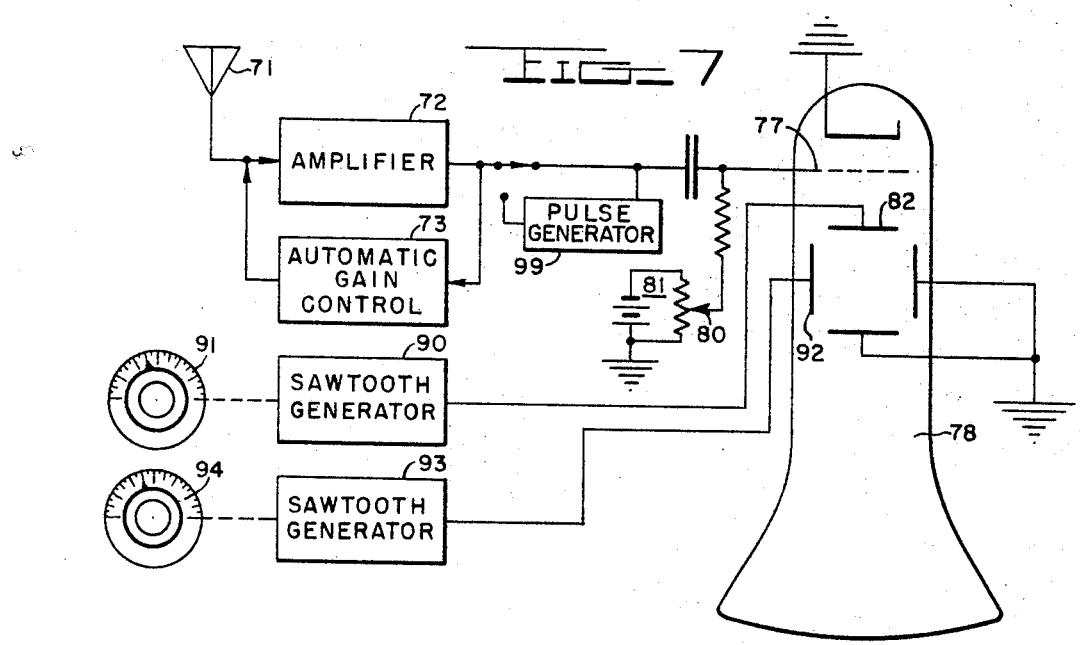
INVENTORS
GEORGE F. ASBURY
EARL J. KOHN
JAMES R. RICHARDS
BY
ATTORNEYS

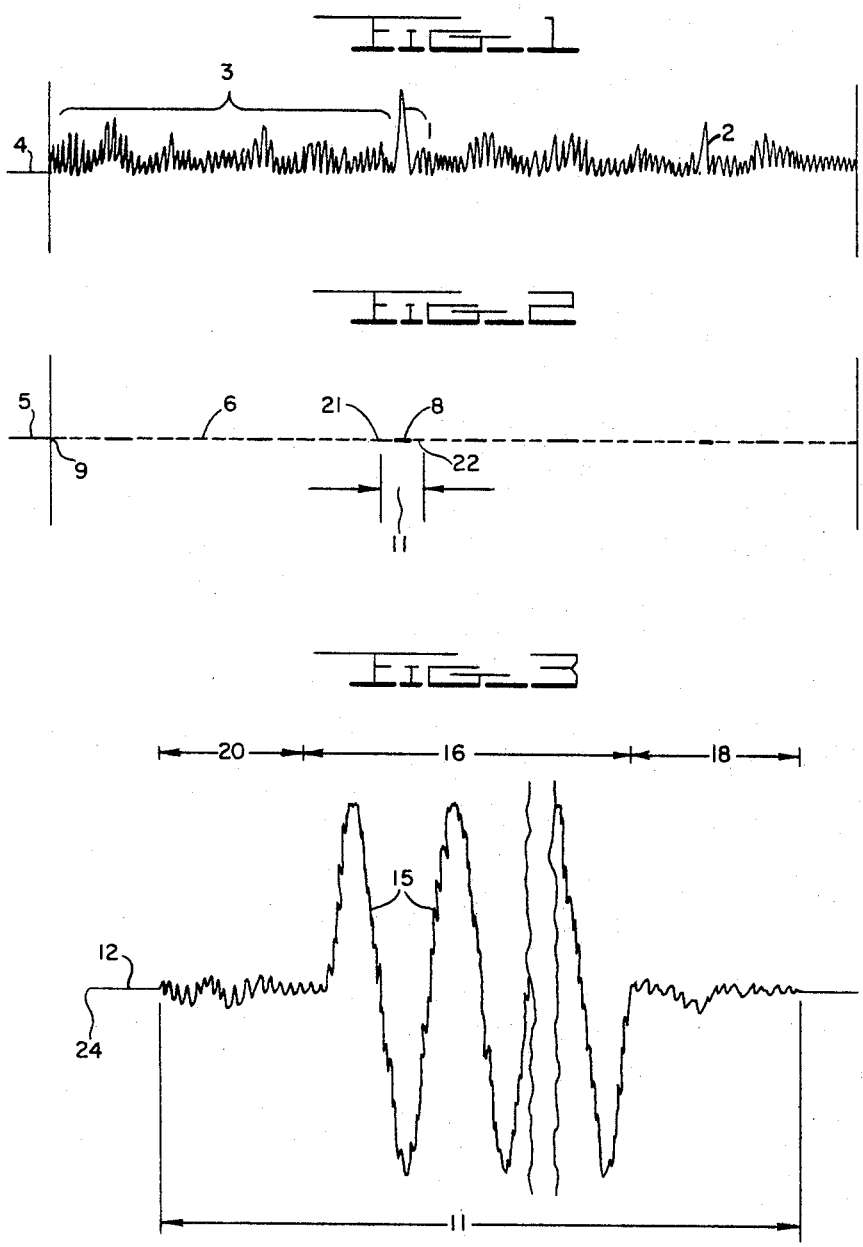

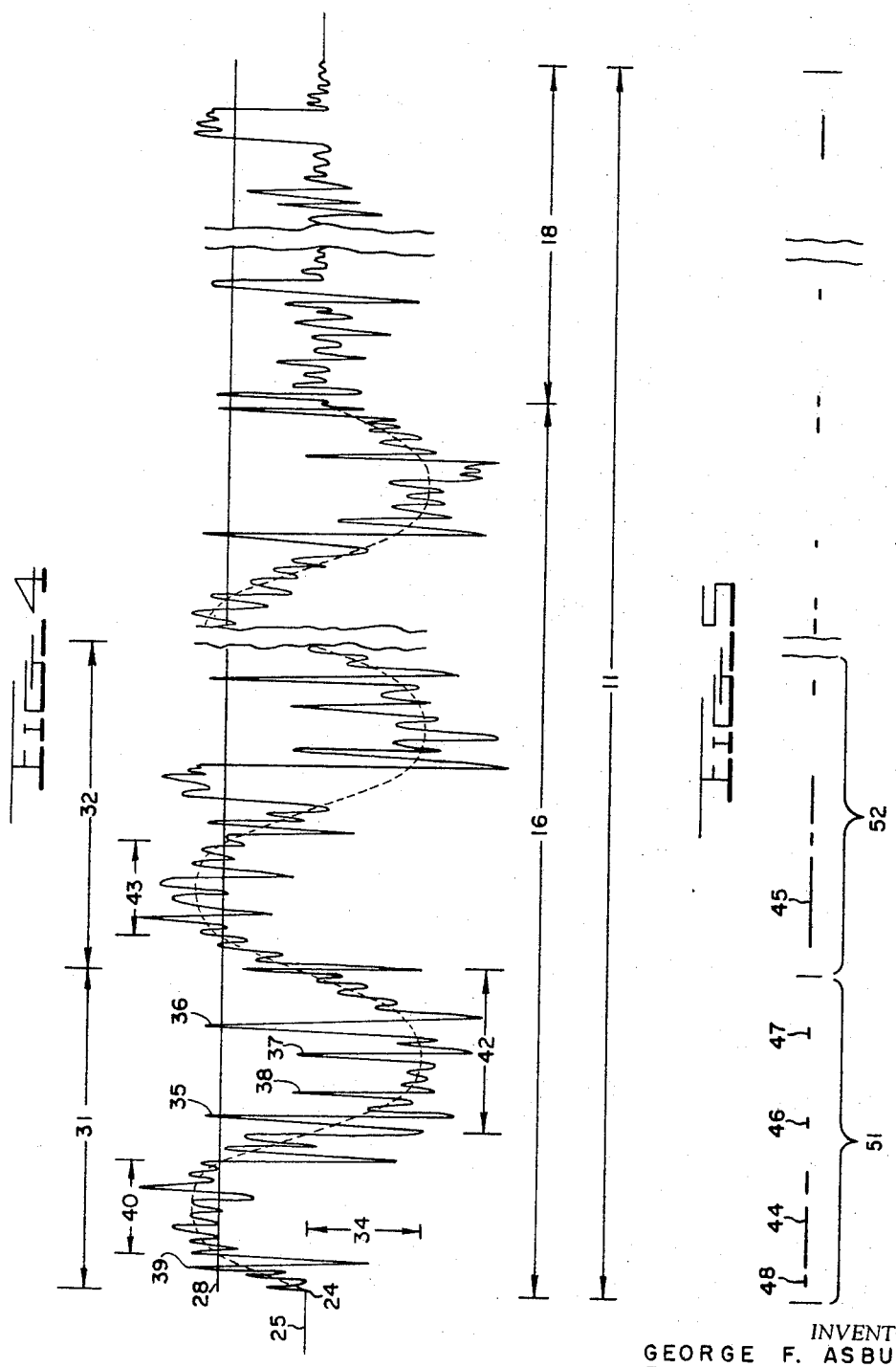

United States Patent Office 3,329,894
Patented July 4, 1967

3,329,894
VISUAL AUTO CORRELATION METHOD TO DISTINGUISH WANTED SIGNAL FROM NOISE
George F. Asbury and Earl J. Kohn, Washington, D.C., and James R. Richards, Cheverly, Md., assignors to the United States of America as represented by the Secretary of the Navy
Filed Aug. 17, 1951, Ser. No. 242,398
5 Claims. (Cl. 324—77)

This invention relates to a method of translating intercepted wave energy signals to a form presentable and perceptible to the visual senses.

More particularly the invention relates to a novel method of translating received wave energy signals into a form suitable for perception by the visual senses, which method enables an easier differentiation between wanted and unwanted wave energy signals than has heretofore been possible, and which therefore makes possible a detection of weaker wanted signals from a background of unwanted signals than those detectable heretofore.

One object of the invention, therefore, is to provide a method for translating wave energy signals to enable visual detection of a weak wanted signal in a background of unwanted signals.

Another object is to provide a wave energy signal translation method which enables early detection of weak signals.

Another object is to provide a method for translating wave energy signals which enables detection of a signal having a particular frequency.

Another object is to provide a method of graphical presentation of wave energy signals which enables integration by the visual senses of the representation of cycles of a particular wanted signal.

Another object is to provide a method which enables measurement of the recurrence rate and degree of regularity of recurrence of cycles of wave energy signals.

Other objects and features of the present invention will appear more fully hereinafter from the following detailed description considered in connection with the accompanying drawings which disclose one embodiment of the invention. It is expressly understood, however, that the drawings are designed for illustration purposes only, and not as a definition of the limits of the invention, reference for the latter purpose being had to the appended claims.

In presently known methods of wave energy signal detection, wanted signals are distinguished from unwanted signals, so far as making their presence known to an observer is concerned, fundamentally on the basis of amplitude discrimination. That is, each signal is translated to a form capable of producing an effect perceptible to the senses, in which form the magnitude of the effect is proportional to the amplitude of the signal it represents. In order for the brain to perceive a difference between the two, the wanted signal must ultimately produce an effect perceptible to the senses which has a greater magnitude than that produced by the unwanted signal. For example, if the auditory senses are to perform the ultimate discrimination between the wanted and unwanted signal, what is generally required is the achievement of a difference in the loudness effect, at any given frequency, produced by the two signals. If the visual senses are to perform the ultimate discrimination, a difference in such visual characteristics as brightness or physical size between the effects produced by the two signals must be achieved. Typical examples of signal presentations designed for amplitude discrimination by the visual senses are the type A and type PPI presentations, respectively, in radar systems, where the display of unwanted signals such as those known in the art as noise is tolerated, but the wanted or target echo signal is distinguished from the unwanted signals by a larger deflection or a brighter spot.

In any such amplitude conscious presentation system, it will be apparent that if a wanted wave energy signal does not have a larger amplitude than an unwanted wave energy signal, it will be masked by the unwanted signal, and its presence will not be perceptible to the senses.

The signal translating method herein described takes advantage of the fact that there are other properties of a wave energy signal by which it can be distinguished from other wave energy signals regardless of their amplitude. Those properties are the recurrence frequency, and the degree of orderliness or regularity of recurrence, hereinafter termed coherence, of the cycles of the wave energy of which the signal is composed. These properties may be readily appreciated in considering the problem of distinguishing between a wave energy signal consisting of a wavetrain of fixed frequency and an unwanted wave energy signal such as noise. The noise signal is characterized by an instantaneous frequency which varies at random over a wide bandwidth, and will therefore from time to time equal the instantaneous frequency of the wanted wavetrain signal. Yet this frequency coincidence exists only momentarily, and successive sycles of the wave energy constituting the noise signal do not recur at the frequency of the cycles in the wanted wavetrain signal, or with the regularity of the cycles of the wanted wavetrain signal.

When a wave energy signal traveling in a medium is intercepted by a signal intercepting device, such as an antenna or a transducer, the arrival at the signal intercepting device of the cycles comprising the wave energy signal is denoted by a cyclical variation in the amplitude of the instantaneous effect produced on the signal intercepting device by the wave energy. For sound waves this instantaneous effect is the instantaneous acoustical pressure. For electromagnetic waves the instanteneous effect produced is an instantaneous voltage or current. In the amplitude alone of cyclical variations in such an instantaneous effect on a signal intercepting device there is not sufficient meaning to enable the cycles of a wanted wave energy signal to be distinglished from an unwanted wave energy signal arriving at the intercepting device simultaneously and producing a cyclical effect at the intercepting device which has the same amplitude as the effect produced by the wanted signal. That is to say a wanted wave energy signal cannot be distinguished from an unwanted wave energy signal on the basis of amplitude, if the two amplitudes are equal.

Intrinsically, however, the cyclical variation in the amplitude of effect on the signal intercepting device, which characterizes the interception of a wave energy signal, does offer a means of measuring both the recurrence rate of the cycles which make up the wave energy, and the degree of regularity of their recurrence. The crest or peak of the amplitude variation produced by each cycle of a signal wavetrain, for example, offers a significant point at which one cycle can be differentiated from another, and the accuracy of this significant point as a boundary between adjacent cycles is substantially independent of the amplitude variation of the crests from one cycle to the next.

One way to observe intercepted wave energy signals, then, to determine if there is an effect produced at the signal intercepting device which varies in a manner denoting the presence of a particular wanted signal, i.e., with a particular degree of coherence and at a particular recurrence rate, is to measure the rate and regularity of recurrence of such significant points in the cyclical variations of the amplitude of the effect produced by the intercepted wave energy signals.

The method of translating the signals which forms the subject of this invention translates the signals into a form such that the visual senses can perform this measurement, and can perceive such a recurrence rate and degree of regularity of recurrence of significant points in the cyclical variations at the signal interception device as is indicative of the reception of a wanted signal.

The invention may best be explained by being considered in connection with the accompanying drawings, which show various forms of graphical presentation of wave energy signals, plotted on linear time bases and in which:

FIG. 1 illustrates one conventional form of visual presentation of wave energy signals.

FIG. 2 illustrates another conventional form of signal presentation different from that in FIG. 1.

FIG. 3 is an enlarged representation of the unrectified form of a portion of the wave energy signals shown in FIG. 2.

FIG. 4 is a further enlarged representation of a portion of the wave energy signals shown in FIG. 3.

FIG. 5 is a graphical presentation of a portion of the wave energy signals shown in FIG. 4, after translation in accordance with the teachings of the invention.

FIG. 6 is a typical graphical presentation of wave energy signals after translation in accordance with the teachings of the invention.

FIG. 7 is a schematic diagram of an exemplary apparatus for performing the signal translating method.

In FIG. 1 there is shown the conventional type A signal presentation familiar in the radar art, in which the wanted target echo signals 1, 2, are distinguishable from unwanted extraneous or noise signals 3 by the larger deflection they produce perpendicular to the linear time base 4. Each deflection is a measure of the amplitude of the envelope of rectified cycles of the wavetrain signal it represents. Generally speaking the received wanted signals cannot be distinguished from received unwanted signals unless the wanted signals produce a deflection of greater amplitude than that produced by unwanted signals. In the type of presentation shown in FIG. 1 the displacement of a target echo signal deflection along the linear time base 4 provides a graphical representation of the elapsed time between transmission of a wavetrain signal and reception of its echo after reflection from the target. This time is readily convertible to distance, as is well known in the art.

FIG. 2 illustrates another type of conventional presentation of the same signals as those shown in FIG. 1, wherein intensity modulation, rather than deflection modulation, of a linear time base is used. Received wavetrain signals are represented by a change, depicted as an increase, in the intensity of the linear time base 5. The intensity of the segment of the time base 5 representing any particular signal is proportional to the amplitude of the envelope of the rectified cycles in the wavetrain comprising the signal. Like time base 4 in FIG. 1 the linear time base 5 in FIG. 2 represents time or distance, and the displacements along the time base of the indications representing individual targets provide a measure of their individual ranges. Received unwanted signals 6 cause a like modulation in the intensity of the linear time base 5, and the amplification of the receiver is adjusted so that in the absence of a wanted target echo signal the unwanted signals intensify the linear time base 5 sufficiently to make it just visible. Under these circumstances a wanted signal 8 is distinguishable from unwanted signals in terms of the increased intensity it produces in the linear time base 5 relative to the intensity produced by unwanted signals. Just as a wanted signal 1 is distinguished from the unwanted signals 3 in FIG. 1 in terms of the amplitude of the deflection it produces in the time base 4, so a wanted signal 8 is distinguished from the unwanted signals 6 in FIG. 2 in terms of the degree of increased intensity it produces in the linear time base 5.

The type of signal presentation shown in FIG. 2 is well known in the sonar art, wherein many such linear time bases are plotted in closely adjacent relationship on a paper record, and over the course of the transmission of several discrete wavetrain signals and the reception of their several corresponding echoes, the several resulting indications of target range enable the time rate of change of target range to be visually ascertained.

It will be apparent that the types of presentation shown in FIGS. 1 and 2 have many shortcomings in enabling visual recognition of the reception of a wanted wavetrain signal which is very weak relative to noise or other extraneous and unwanted signals. For example, in FIG. 2 if individual unwanted signals are received and converted to short intensified segments of the linear time base 5, and the amplitude of these individual unwanted signals is greater than the amplitude of a wanted wavetrain signal, there will be present in the linear time base 5 extraneous intensified segments of intensity equal to or greater than that representing the wanted signal 8. Under such circumstances only the continuous plotting of both wanted and unwanted signals and noise on many such adjacent time bases, as above described, will enable the wanted signal 8, by reason of its fixed displacement from the beginning 9 of the time base 5, to be distinguished from the randomly displaced unwanted signals. Such a solution requires uninterrupted reception of wanted signals for a considerable time.

This invention herein described provides a method of translating and displaying wave energy signals which serves to overcome such shortcomings, and makes the presence of a weak wanted signal readily apparent much more quickly.

Turning to FIG. 3 there is shown an enlarged graphical representation of the unrectified form of wave energy signals received during the increment of time represented by the increment 11 of time base 5 of FIG. 2, plotted on an expanded horizontal linear time base 12, with vertical deflection from the time base 12 denoting amplitude of the instantaneous effect produced on the signal intercepting device by the wave energy signals received. FIG. 3 might be considered analogous to an enlarged orthographic projection of a front view of the signals received during the time increment 11 of which the type of representation shown in FIG. 2 is a top view. The increased amplitude and regularity of recurrence of the cyclical deflections 15 in time increment 16 of FIG. 3 corresponds to the greater intensity of the portion of the linear time base 5 which represents the wanted wavetrain signal 8 within increment 11 of FIG. 2. Immediately adjacent the increment 16 to the right and left on the linear time base 12 of FIG. 3 are plotted in increments 18 and 20, respectively, the lesser amplitude signals corresponding to the unwanted signals received immediately before and after wanted signal 8, and represented in FIG. 2 by the portions 21 and 22 of the linear time base 5.

FIG. 3, it will be recognized, is really a graphical representation of the effect produced at the antenna, transducer, or other signal intercepting device, by wave energy signals both wanted and unwanted arriving during the brief increment of time 11. Zero amplitude level 24 of vertical deflection from the linear time base 12 of FIG. 3 corresponds to a quiescent condition at the wave energy signal intercepting device. This condition would occur during the absence of any signal in the medium having an amplitude sufficient to come within the sensitivity range of the particular signal intercepting device utilized.

FIG. 4 is another representation of received wave energy signals such as those displayed within time increments 16 and 18 of FIG. 3, plotted on a linear time base 25, expanded to a still greater degree than time base 12 of FIG. 3. Like FIG. 3, FIG. 4 shows a representation plotted against time of the amplitude of the effect produced by received signals on a signal intercepting device during a brief increment of time of the order of several cycles 31, 32, etc., of the wanted wavetrain signal. FIG. 3 has shown an expanded representation of the unrectified form of the signals shown in FIGS. 1 and 2, wherein there is a large amplitude differential between the effect produced on the signal intercepting device by a wanted wavetrain signal and unwanted signals received immediately before and after. This amplitude differential is sufficient to make the wanted wavetrain signal readily distinguishable. FIG. 4, however, is intended to show an effect on the representation of unwanted received signals produced by the simultaneous reception of a wanted wavetrain signal, which effect will enable even very weak wanted wavetrain signals to be made readily apparent.

This effect is the variation, at the frequency and with the regularity of the cycles of the wanted wavetrain signal, of the amplitude above and below the zero level 24 on linear time base 25 of the crests or peaks of the cycles of extraneous unwanted signals. This variation or modulation of the instantaneous amplitude of the unwanted signal cycle peaks above or below amplitude level 24 is shown in time increment 16 of FIG. 4, and can be explained by the fact that at any instant the total or composite effect on the signal intercepting device of wave energy signals being intercepted is the simple summation of the individual effect of all signals being intercepted at that instant. Thus while in the absence of a wanted wavetrain signal the time variation of the amplitude of the effect produced at the signal interception device by unwanted signals may be represented graphically as shown in time increment 18 of FIG. 4, interception of a wanted wavetrain signal simultaneously with extraneous unwanted signals periodically adds to and substracts from the amplitude of the total instantaneous effect produced at the signal intercepting device, as shown in increment 16 of FIG. 4, at the frequency and with the regularity of the cycles 31, 32, etc. composing the wanted wavetrain signal. Even though the amplitude 34 of the peaks of the cycles of the wanted wavetrain signal is less than the amplitude of many of the individual peaks 35, 36, etc. of unwanted signals received simultaneously, yet this periodic addition and subtraction at the signal intercepting device occurs, and by proper translation of the net composite signal as received, the presence in the composite signal of the coherent cycles of the wanted wavetrain signal can be made apparent.

In accordance with this invention the presence of a wanted wavetrain signal can be made perceptible to the visual senses if the received signals are translated to a form of graphical presentation which correlates the time of occurrence of certain peak values in the amplitude of the composite effect produced by the received signals on the signal intercepting device. Considering FIG. 4 for instance, it will be apparent that the presence of the generally sinusoidal wanted wavetrain signal shown in time increment 16 has increased the amplitude level of some of the unwanted signal peaks occurring during the time increments 40 and 43, which are coincident with the peak portions of the positive halves of cycles 31 and 32, respectively, of the wanted wavetrain signal, to a value greater than amplitude level 28. Conversely some of the unwanted signal peaks 37, 38, etc. occurring during time increment 42, which normally might have had an amplitude level exceeding the level 28, are reduced by the addition of the negative half of cycle 31 of the wanted wavetrain signal to a value slightly below level 28.

This invention provides for recording the composite waveform shown in FIG. 4 in terms of intensity modulation of a linear time base, expanded to the same degree as that of time base 25. This linear time base does not, like that shown in FIG. 2, provide a graphical representation of the time of reception of wave energy signals relative to the time of transmission of a particular wavetrain signal, but rather is designed to serve as a locus upon which may be produced a graphical representation of the time of occurrence of peak values of amplitude in the composite received signal, relative to successive increments of time of a length corresponding to the period of one cycle of the wanted wavetrain signal. The linear time base which the invention provides is made up of a family of incremental linear time bases, each of which has a length equal to the period of one cycle of the wanted wavetrain signal. These incremental linear time bases are arranged in closely adjacent side by side relation, with a spacing small relative to their length.

If the portion of the composite waveform shown in FIG. 4 coincident with cycle 31 of the wanted wavetrain signal is converted to intensity modulation, i.e., utilized to intensify a linear time base to a degree proportional to its amplitude, it may be seen that the portion of the linear time base representing time increment 40 will be intensified to a greater degree than the portion representing increment 42. If amplitude level 28 be defined as that amplitude which will produce an intensity sufficient to make the linear time base just discernible, then it may be seen that coincident with portions of the composite signal waveform having an amplitude exceeding level 28, such as that during increment 40, the linear time base will be perceptibly intensified, and an intensified portion of the incremental linear time base will represent a peak of amplitude of the composite signal above level 28.

FIG. 5 shows linear incremental time bases 51, 52, intensity modulated responsive to the portions of the composite signal waveform coincident with cycles 31 and 32, respectively, in FIG. 4. Intensified portions 44 and 45 represent portions 40 and 43 of the waveform in FIG. 4, while intensified portions 46, 47, and 48 represent extraneous peaks 35, 36 and 39 in FIG. 4.

When succedent increments of the composite signal waveform are recorded in terms of intensity modulation on succedent incremental time bases such as 51 and 52, each such incremental time base provides a graphical record of the moment of occurrence of peaks in the composite waveform, above the level 28, relative to the beginning and end of the time increment it represents. When the composite signal waveform is so recorded it will be seen that the intensified portion 45, corresponding to the peak portion 43 of the positive half of cycle 32, has roughly the same phase relation with the beginning and end of its respective incremental time base 52 as does intensified portion 44, corresponding to the peak portion 40 of the positive half of cycle 31, with its incremental time base 51. In spite of the negative influence of the negative half cycles of the wanted wavetrain signal on the amplitude of peaks of extraneous unwanted signals, occasionally such peaks may have sufficient amplitude to rise above level 28 during time increments such as 42. For these peaks, such as 35 and 36, corresponding portions of an incremental time base will be intensified, as shown at 46, 47. However, from cycle to cycle of the wanted wavetrain signal and hence from one incremental time base to the next succeeding incremental time base, such peaks will have a random phase displacement relative to the beginning of the respective cycle of the wavetrain during which they occur. If the signal translating method thus far described is practiced continuously upon the composite received signal, and the succedent incremental time bases representing succeeding cycles of the wanted wavetrain signal are plotted continuously in closely adjacent side by side relationship, it will be found that the intensified portions such as 44 and 45 will have roughly the same phase relation from one incremental time base to the next. Over the course of several hundred such incremental time bases, representing a total length of time equal to several hundred cycles of the wanted wavetrain signal, these intensified portions will therefore present the appearance of an integrated coherent pattern or area of linear form, which intersects all of the incremental time bases and is composed of the intensified portions in all of the incremental time bases representing portions of the composite signal such as 40 and 43.

Such an effect is represented in FIG. 6, which for the sake of clarity of presentation shows only a small number of adjacent linear incremental times bases 62, 63 etc., arranged side by side, and yet clearly shows the integration or summation effect which occurs when the intensified portions representing time increments such as 40 and 43 in several cycles of the wanted signal are produced. The effect is to create a coherent linear area 49 having an intensiity which contrasts perceptibly with an area 50, of lesser average intensity, containing the intensified portions corresponding to random peaks above level 28 which occur during the remainder of each linear incremental time base.

When the successive linear incremental time bases are exactly equal to the period of one cycle of the wanted wavetrain signal, then the intensified portions representing the peaks of positive half cycles of the wanted signal will have an unvarying phase relation with the beginning of their respective incremental time bases. The linear area 49 will therefore be generally straight in form, and will be oriented substantially perpendicular to the individual incremental time bases. If there is phase modulation of the cycles in the wanted wavetrain signal, the linear area 49 will be curved or distorted accordingly. When the linear incremental time bases differ slightly in length from the period of one cycle of the wanted signal, then successive intensified portions representing successive peaks of positive half cycles of the wanted signal will be progressively displaced in phase from one incremental time base to the next, and linear area 49 will acquire a sloping orientation. Details of the significance and utility of such a sloping orientation are set out fully in our copending application entitled "Object Detecting System," Ser. No. 247,186, filed Sept. 18, 1951.

During the absence of any wanted wavetrain signal, an example of the time variation of the amplitude of the effect produced at the wave signal intercepting device by unwanted signals is represented in time increment 18 of FIG. 4. It is apparent that occasional peaks in these unwanted signals will exceed the amplitude level 28, and since the graphical representation process heretofore described is a continuous one, these peaks will appear as individual intensified portions plotted on the particular incremental time base, corresponding to 51, 52, etc., during which they occur. The greater number of peaks above amplitude 28 during time increment 18 will cause the linear time base to be perceptibly intensified more often than during a time increment such as increment 42, when the influence of the negative half of a cycle of the wanted wavetrain signal is felt. The portion of the time base of FIG. 6 representing increment 18 will therefore occupy an area 61, having a greater average intensity than the area representing time increments such as 42, and yet having a substantially lesser intensity than the linear area 49 composed of the aligned intensified portions 44, 45, etc., representing portions of the composite signal coincident with time increments such as 40 and 43.

From what has been said, it may be seen that the time base as thus formed is the equivalent of a time base consisting of a single line, expanded in length sufficiently to show the composite received signal waveform in much greater detail than has heretofore been utilized in signal presentation systems, and then partitioned or segmented into increments of such a length that when arranged in the particular fashion described, there is created a physical integration, perceptible to the eye in the form of a coherent pattern, of the cyclical effect of the wanted wavetrain signal on the signal intercepting device.

An exemplary apparatus for performing the subject signal translating method is shown in FIG. 7. In the signal intercepting device 71 intercepted signals are converted to a voltage whose instantaneous amplitude is proportional to the amplitude of the instantaneous effect produced by the signal on the signal intercepting device.

The composite signal voltage derived in signal intercepting device 71 is amplified in amplifier 72. Amplifier 72 is preferably broad band, to avoid phase distortion of the peaks in the composite signal. A conventional automatic gain control 73 is preferably provided to maintain the average value of the positive peaks in the composite signal waveform, in the absence of a wanted signal, at about the amplitude level 28 of FIG. 4, as will be explained more fully hereinafter. The gain control 73 should act slowly enough to correct only for gradual changes in the average signal level, without compensating for instantaneous changes in the amplitude of the composite signal or cyclical changes in the amplitude of the composite signal influenced by the cycles of the wanted wavetrain signal.

The output composite signal waveform from amplifier 72 is fed to the intensity control grid 77 of a cathode ray tube 78 and thereby serves to intensity modulate the electron beam of the tube 78. Intensity control grid 77 is provided with an adjustable tap 80 to bias supply 81, so that its bias potential may be adjusted to make the electron beam just discernible on the face of the cathode ray tube when a signal of amplitude level 28, as established by the gain control 73, is delivered from the amplifier 72. Under these conditions it will be apparent that portions of the composite signal waveform output of amplifier 72 which has an amplitude exceeding level 28 will be represented by discernible intensifications of the electron beam.

In order to provide the succession of incremental linear time bases of length equal to the period of one cycle of the wanted wavetrain signal, the vertical electrostatic beam deflecting plates 82 of the cathode ray tube 78 are connected to a conventioinal sawtooth voltage generator 90, designed to produce a sawtooth output wave of widely variable frequency, and provided with a control 91 by which the frequency of the sawtooth output waveform may be adjusted to equal that of the wanted signal. With such an adjustment the period of each vertical sweep of the electron beam is made equal to the period of one cycle of the wanted signal, and therefore each vertical sweep produces one incremental linear time base. The horizontal deflecting plates 92 of the cathode ray tube are likewise connected to sawtooth voltage generator 93, designed to produce a sawtooth deflection voltage of low frequency. The period of one horizontal sweep cycle is variable by control 94, and is preferably adjusted to provide in closely spaced relation on the face of the cathode ray tube a number of incremental linear time bases, i.e., vertical sweeps, of the order of several hundred.

The number of incremental linear time bases produced on the face of the oscilloscope for substantially simultanoues observance is not critical provided sufficient incremental time bases are displayed to create a linear area such as 49, representing the peak portions from many cycles of the wanted signal, which has a length or dimension in the horizontal sweep direction large enough to be perceptible, and provided the number is not so great relative to the length of the horizontal sweep as to condense the length of such a linear area 49 to a point. With a wanted wavetrain signal frequency of 25,000 c.p.s. for example it has been found desirable to use a cathode ray oscilloscope of three inch diameter and a horizontal sweep frequency of the order of 10 cycles per second to display wanted wavetrain signals of a length equal to two or three hundred cycles.

In an optional arrangement for reducing the thickness of the linear area 49, i.e., its dimension in the direction of the vertical sweep, a conventional pulse generator 99 may be interposed between amplifier 72 and grid 77, to produce, in response to each portion 44, 45, 46, etc., of the composite waveform above level 28, marker signals in the form of pulses having a uniform duration which is short relative to time increments such as 40 and 43. These pulses may then be used to intensify the linear time base in place of the peaks of the output signal above level 28 direct from amplifier 72. The conventional pulse generator 99 may take the form, for example, of a one-shot multivibrator having its input grid element so biased as to be triggered only by signals having an amplitude above level 28.

The choice of practical apparatus for producing the type of graphical presentation shown in FIG. 6 is not limited to a cathode ray tube, but may well depend upon the frequency of the wanted signal wavetrain and/or the type of unwanted extraneous signals from which the wanted signal must be distinguished. A recording device utilizing as a display medium a paper record marked by an electro-mechanical stylus, such as the type commonly used in the sonar art to produce the presentation of FIG. 2, may be used, for example, if the wanted wavetrain signal frequency is low. In such an arrangement in order to produce successive incremental linear time bases such as 51, 52, etc., the excursion time of the stylus across the paper must equal the period of one cycle of the wanted wavetrain signal. If the wanted wavetrain signal frequency is of the order of several thousand cycles per second or higher, however, difficulties will be encountered with the electro-mechanical type of recording device and it may be desirable to use a recording instrument of less inertia for generating the incremental time bases, such as the cathode ray oscilloscope.

The graphical presentation of received signals thus produced by the signal translation method described is merely a physical picture of the time relation between signal peaks above the arbitrary amplitude level 28. The essential goal in the display is to show the time relation of enough of these peaks so that the effect of the presence or absence of a wanted signal on the orderliness and regularity of recurrence of peaks in the composite wave energy signal received is apparent to the eye. To do this it is necessary to plot, in a graphical presentation area small enough to be viewed instantaneously, intensified portions representing peaks above amplitude level 28 in the composite received signal waveform during a total time equivalent to many cycles of the wanted signal. Since, in the absence of a wanted wavetrain signal, the amplitude level 28 is maintained so that the linear incremental time bases such as 51, 52, etc., composing the graphical presentation area are just discernible, then the arrival of a wanted signal wavetrain at the signal intercepting device 71 becomes immediately apparent. The reason for this is that the wanted signal adds to the amplitude of the peaks representing unwanted signals in a periodic fashion as shown in FIG. 4, thus periodically increasing their amplitude above the amplitude level 28 at which perceptible intensified portions of the time base are produced. And this increase, slight though it may be during the presence of a weak wanted signal, will be made apparent on the graphical presentation by a filling in of portions of the presentation area not previously perceptibly intensified. The resulting effect is to produce a coherent linear area on the presentation area, such as shown at 49 in FIG. 6, having a distinctly greater intensity than that of the remaining portion of the presentation area. The above effect serves to indicate the presence of the weakest wanted wavetrain signals only when the linear incremental time bases 51, 52, etc., are arranged close enough together on the presentation area so that the space between them is very small relative to their length, and the total presentation area is almost completely occupied by the plurality of incremental time bases. Under such circumstances the contrast between the average intensity of the area 61 representing the composite received signal during the absence of a wanted signal, and the intensity of the coherent linear area 49 formed during the presence of a wanted signal, is sufficiently perceptible to reveal the interception of a wanted wavetrain signal.

Various modifications of the signal translating method herein described may be made without departing from the spirit of the invention as defined by the appended claims. For example it will be readily understood that the linear incremental time bases herein defined may be harmonically related with the period of one cycle of a wanted wavetrain signal by a ratio other than one, in which case the number of coherent areas such as 49 will equal the harmonic ratio. Also the polarity of the intensity modulation of the signal presentation may be reversed, so that in a cathode ray tube environment, for example, presence of a wanted signal is indicated by a coherent linear area denoted by an absence of brightness, i.e., darkness, distinctly greater than the average.

The invention described herein may be manufactured and used by or for the Government of the United States of America for governmental purposes without the payment of any royalties thereon or therefor.

What is claimed is:

1. A method of visually detecting a signal of a particular frequency contained in a composite waveform which may include signal energies of greater amplitude than that of the signal of particular frequency, said visual detection being displayed by visual storage means capable of recording time and intensity modulation, comprising the steps of recording the instantaneous intensity of said composite waveform with respect to time, dividing said recording into segments of equal length such that the segment length is approximately harmonically related to the period of the frequency of the particular signal, and positioning said segments in sequential juxtaposition whereby even low intensity signals recurring at the particular frequency will produce a visual line across said segments.

2. A method of visually detecting a signal of a particular frequency contained in a composite waveform which may include signal energies of greater amplitude than that of the signal of particular frequency, said visual detection being displayed by visual storage means capable of recording time and intensity modulation, comprising the steps of recording the instantaneous intensity of said composite waveform with respect to time, dividing said recording into segments of equal length such that the segment length is equal to the period of the frequency of the particular signal, and positioning said segments in sequential juxtaposition whereby even low intensity signals recurring at the particular frequency will produce a visual line across said segments.

3. A method of visually detecting on a cathode ray tube screen a signal of a particular frequency contained in a composite waveform which may include signal energies of greater amplitude than that of the signal of particular frequency comprising the steps of intensity modulating the electron beam of the cathode ray tube with the composite signal waveform, sweeping the cathode ray tube beam in a first direction at a rate approximately harmonically related to the particular frequency, and simultaneously sweeping the electron beam in a second direction at right angles to said first direction at a rate a great many times slower than that of said first sweep whereby signals recurring at approximately the particular frequency will be indicated by a line substantially parallel to said second direction.

4. A method of visually detecting on a cathode ray tube screen a signal of a particular frequency contained in a composite waveform which may include signal energies of greater amplitude than that of the signal of particular frequency comprising the steps of intensity modulating the electron beam of the cathode ray tube with the composite signal waveform, sweeping the cathode ray tube beam in a first direction a rate equal to the particular frequency, and simultaneously sweeping the electron beam in a second direction at right angles to said first direction at a rate a great many times slower than that of said first sweep whereby signals recurring at approximately the particular frequency will be indicated by a line substantially parallel to said second direction.

5. A method of detecting a radiating source of a particular frequency which may be radiating at a level lower than ambient noise, said detection being made on a visual display capable of recording time and intensity modulation, comprising the steps of continuously recording with respect to time all signals emanating from the direction of the radiating source, dividing said recording into segments of equal length such that the segment length is approximately harmonically related to the period of the particular frequency, and positioning said segments in sequential juxtaposition whereby the coherence of signals including lower than noise level signals recurring at the particular frequency will produce a visual line across said segments.

References Cited

UNITED STATES PATENTS

| | | | |
|---|---|---|---|
| 1,858,931 | 5/1932 | Langevin et al. | |
| 2,223,224 | 11/1940 | Newhouse | 343—9 |
| 2,408,039 | 9/1946 | Busignies | 343—118 |
| 2,408,415 | 10/1946 | Donaldson | 343—13 |
| 2,465,113 | 3/1949 | Norgaard | 343—17.1 |
| 2,520,693 | 8/1950 | Roberts | 343—113 |
| 2,539,001 | 1/1951 | Winchel. | |
| 2,629,084 | 2/1953 | Eckart | 343—13 |
| 2,718,638 | 9/1955 | De Rosa | 343—13 |
| 2,756,417 | 7/1956 | Bartelink | 343—10 |

RUDOLPH V. ROLINEC, *Primary Examiner.*

CHESTER L. JUSTUS, JAMES L. BREWRINK,
*Examiners.*

P. H. BLAUSTEIN, M. R. WILBUR, P. F. WILLE,
*Assistant Examiners.*